(12) United States Patent
Buchanan et al.

(10) Patent No.: US 10,963,187 B2
(45) Date of Patent: Mar. 30, 2021

(54) DISCRETE EXCHANGE AND UPDATE OF MULTIPLE CONSISTENT SUBSET VIEWS OF AN EVOLVING DATA STORE

(71) Applicant: Cirrus Logic International Semiconductor Ltd., Edinburgh (GB)

(72) Inventors: Nathan Buchanan, Austin, TX (US); Roshan Kamath, Austin, TX (US); Nariankadu D. Hemkumar, Austin, TX (US); Younes Djadi, Austin, TX (US); Sachin Deo, Austin, TX (US); Eric B. Smith, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 43 days.

(21) Appl. No.: 16/437,746

(22) Filed: Jun. 11, 2019

(65) Prior Publication Data
US 2020/0393990 A1 Dec. 17, 2020

(51) Int. Cl.
*G06F 3/06* (2006.01)
*H04N 5/232* (2006.01)

(52) U.S. Cl.
CPC .......... *G06F 3/0659* (2013.01); *G06F 3/0604* (2013.01); *G06F 3/0656* (2013.01); *G06F 3/0673* (2013.01); *H04N 5/232* (2013.01)

(58) Field of Classification Search
CPC .... G06F 3/0659; G06F 3/0604; G06F 3/0656; G06F 3/0673; H04N 5/232
See application file for complete search history.

(56) References Cited

U.S. PATENT DOCUMENTS

| 2014/0351494 | A1* | 11/2014 | Barthe | G06F 12/0246 711/103 |
| 2016/0119570 | A1* | 4/2016 | Wong | H04N 5/357 348/308 |
| 2018/0225063 | A1* | 8/2018 | Singhvi | G06F 3/061 |
| 2019/0019532 | A1* | 1/2019 | Granneman | H04N 19/172 |
| 2019/0205244 | A1* | 7/2019 | Smith | G06F 12/12 |
| 2019/0317727 | A1* | 10/2019 | Antonopoulos | G06F 3/0656 |
| 2020/0272365 | A1* | 8/2020 | Huang | H03M 7/6058 |

* cited by examiner

*Primary Examiner* — Amy R Hsu
(74) *Attorney, Agent, or Firm* — Jackson Walker L.L.P.

(57) ABSTRACT

A system for reading a plurality of subset views of an evolving data store may include for each subset view, a plurality of memory buffers comprising at least three buffers. The system may also include control circuitry for controlling the plurality of memory buffers of the plurality of subset views, the control circuitry configured to maintain, for each subset view, a variable defining a most-recently updated buffer of the plurality of buffers such that a read request for such subset view will respond with data of the most-recently updated buffer of such subset view; and responsive to an update of data of the evolving data store: (i) determine, for each subset view, a selected data buffer of the plurality of buffers other than the most-recently updated buffer for such subset view to write updated subset view information; (ii) cause, for each subset view, the updated subset view information for such subset view to be written to the selected data buffer for such subset view; and (iii) substantially simultaneously across all of the plurality of subset views, update the variables defining the most-recently updated buffer of the plurality of subset views such that a subsequent read request for a subset view will respond with the updated subset view information for such subset view.

16 Claims, 3 Drawing Sheets

DISCRETE EXCHANGE AND UPDATE OF MULTIPLE CONSISTENT SUBSET VIEWS OF AN EVOLVING DATA STORE

FIELD OF DISCLOSURE

The present disclosure relates in general to electronic devices, and more particularly, to discrete exchange and update of multiple consistent subset views of an evolving data store, as may be used in a system for controlling a position of a camera in a mobile device, and/or other suitable applications.

BACKGROUND

Many traditional mobile devices (e.g., mobile phones) include one or more cameras for capturing images. To provide for image stabilization and focus, a position of a camera within a plane substantially parallel to a subject of an image as well as a position of a lens of the camera in a direction perpendicular to such plane, may be controlled by a plurality of motors under the control of a camera controller. A control system may be implemented using an applications processor of the mobile device coupled via a communication interface (e.g., an Inter-Integrated Circuit or I2C interface) to a camera controller local to the camera and its various motors. For example, the applications processor may communicate to the camera controller a vector of data regarding a target position, whereas the camera controller may communicate to the applications processor a vector regarding an actual position of the camera, as sensed by a plurality of magnetic sensors (e.g., Hall sensors) and/or other appropriate sensors.

The transfer of vector data from the camera controller to the applications processor may be a transfer in which the data is asynchronously produced by the camera controller and asynchronously consumed by the applications processor. In addition, in many instances, vector data may be stored in a data store that may evolve over time. Such data store may be represented in a plurality of subset views, wherein each subset view includes a subset of the data stored in the data store. These multiple subset views may optimize communication interface efficiency for different tasks. A communication interface may support one transaction at a time, and thus transactions may not overlap in time.

The various subset views must be consistent as read by the applications processor. Accordingly, a write of a register of the data store that appears in multiple views must affect the value read back for such register for all views including the register. Further, a read of a register of the data store that appears in multiple views must not return an old value in one view after a new value is read for the register in a different view.

SUMMARY

In accordance with the teachings of the present disclosure, the disadvantages and problems associated with exchange and update of subset views of a data store may be reduced or eliminated.

In accordance with embodiments of the present disclosure, a system for reading a plurality of subset views of an evolving data store may include for each subset view, a plurality of memory buffers comprising at least three buffers. The system may also include control circuitry for controlling the plurality of memory buffers of the plurality of subset views, the control circuitry configured to maintain, for each subset view, a variable defining a most-recently updated buffer of the plurality of buffers such that a read request for such subset view will respond with data of the most-recently updated buffer of such subset view; and responsive to an update of data of the evolving data store: (i) determine, for each subset view, a selected data buffer of the plurality of buffers other than the most-recently updated buffer for such subset view to write updated subset view information; (ii) cause, for each subset view, the updated subset view information for such subset view to be written to the selected data buffer for such subset view; and (iii) substantially simultaneously across all of the plurality of subset views, update the variables defining the most-recently updated buffer of the plurality of subset views such that a subsequent read request for a subset view will respond with the updated subset view information for such subset view.

In accordance with these and other embodiments of the present disclosure, a method for reading a plurality of subset views of an evolving data store may include for each subset view, maintaining a plurality of memory buffers comprising at least three buffers, maintaining, for each subset view, a variable defining a most-recently updated buffer of the plurality of buffers such that a read request for such subset view will respond with data of the most-recently updated buffer of such subset view, and responsive to an update of data of the evolving data store: (i) determining, for each subset view, a selected data buffer of the plurality of buffers other than the most-recently updated buffer for such subset view to write updated subset view information; (ii) causing, for each subset view, the updated subset view information for such subset view to be written to the selected data buffer for such subset view; and (iii) substantially simultaneously across all of the plurality of subset views, updating the variables defining the most-recently updated buffer of the plurality of subset views such that a subsequent read request for a subset view will respond with the updated subset view information for such subset view.

In accordance with these and other embodiments of the present disclosure, a computer program product for reading a plurality of subset views of an evolving data store may include a computer usable medium having computer readable code physically embodied therein. The computer program product may further include computer readable program code configured to, for each subset view, maintain a plurality of memory buffers comprising at least three buffers, maintaining, for each subset view, a variable defining a most-recently updated buffer of the plurality of buffers such that a read request for such subset view will respond with data of the most-recently updated buffer of such subset view, and responsive to an update of data of the evolving data store: (i) determine, for each subset view, a selected data buffer of the plurality of buffers other than the most-recently updated buffer for such subset view to write updated subset view information; (ii) cause, for each subset view, the updated subset view information for such subset view to be written to the selected data buffer for such subset view; and (iii) substantially simultaneously across all of the plurality of subset views, update the variables defining the most-recently updated buffer of the plurality of subset views such that a subsequent read request for a subset view will respond with the updated subset view information for such subset view.

In accordance with these and other embodiments of the present disclosure, a camera controller may include for each subset view of a plurality of subset views of an evolving data store, a plurality of memory buffers comprising at least three buffers and a processor. The processor may be configured to maintain, for each subset view, a variable defining a most-recently updated buffer of the plurality of buffers such that a read request for such subset view will respond with data of the most-recently updated buffer of such subset view, and responsive to an update of data of the evolving data store: (i) determine, for each subset view, a selected data buffer of the plurality of buffers other than the most-recently updated buffer for such subset view to write updated subset view information; (ii) cause, for each subset view, the updated subset view information for such subset view to be written to the selected data buffer for such subset view; and (iii) substantially simultaneously across all of the plurality of subset views, update the variables defining the most-recently updated buffer of the plurality of subset views such that a subsequent read request for a subset view will respond with the updated subset view information for such subset view.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

In accordance with embodiments of the present disclosure, a triple buffer scheme may enable efficient asynchronous and non-blocking transfer of configurable-length vector atomic time-variant data. Atomicity of transactions may be guaranteed by buffer pointers that may designate buffers in use and a procedure to determine a free buffer for storing a vector of data to be written by a producer (e.g., transmitter) of data.

Figure 1:
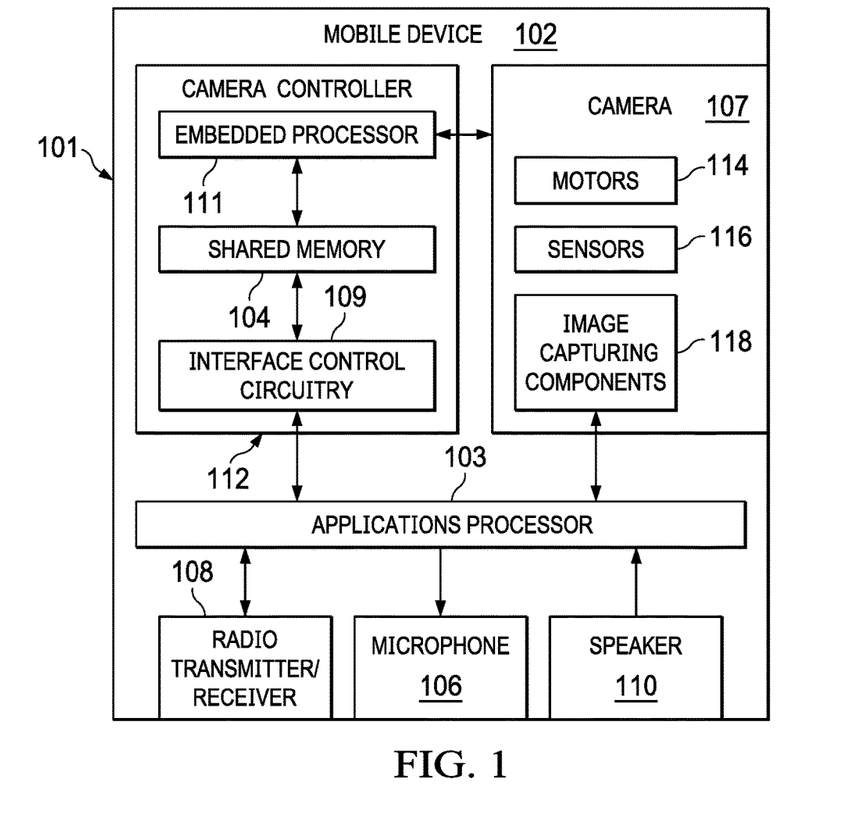
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, an applications processor 103, a microphone 106, a camera 107, a radio transmitter/receiver 108, a speaker 110, and a camera controller 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Applications processor 103 may be housed within enclosure 101 and may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (not explicitly shown) and/or other computer-readable media accessible to applications processor 103.

Microphone 106 may be housed at least partially within enclosure 101, may be communicatively coupled to applications processor 103, and may comprise any system, device, or apparatus configured to convert sound incident at microphone 106 to an electrical signal that may be processed by applications processor 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to applications processor 103, and may include any system, device, or apparatus configured to, with the aid of an antenna, generate and transmit radio-frequency signals as well as receive radio-frequency signals and convert the information carried by such received signals into a form usable by applications processor 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to applications processor 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Camera 107 may be housed at least partially within enclosure 101 (and partially outside of enclosure 101, to enable light to enter a lens of camera 107), and may include any suitable system, device, or apparatus for recording images (moving or still) into one or more electrical signals that may be processed by applications processor 103. As shown in FIG. 1, camera 107 may include a plurality of motors 114, sensors 116, and image capturing components 118.

Image capturing components 118 may include a collection of components configured to capture an image, including without limitation, one or more lenses and image sensors for sensing intensities and wavelengths of received light. Such image capturing components 118 may be coupled to applications processor 103 such that camera 107 may communicate captured images to applications processor 103.

Motors 114 may be mechanically coupled to one or more of image capturing components 118, and each motor 114 may include any suitable system, device, or apparatus configured to, based on control signals received from camera controller 112 indicative of a desired camera position, drive mechanical motion of such one or more image capturing components 118 to such desired camera position.

Sensors 116 may be mechanically coupled to one or more of image capturing components 118 and/or motors 114 and may be configured to sense a position associated with camera 107. For example, a first sensor 116 may sense a first position (e.g., x-position) of camera 107 with respect to a first linear direction, a second sensor 116 may sense a second position (e.g., y-position) of camera 107 with respect to a second linear direction normal to the first linear direction, and a third sensor 116 may sense a third position (e.g., z-position) of camera 107 (e.g., position of lens) with respect to a third linear direction normal to both the first linear direction and the second linear direction.

Camera controller 112 may be housed within enclosure 101, may be communicatively coupled to camera 107 and applications processor 103 (e.g., via an Inter-Integrated Circuit (I2C) interface), and may include any system, device, or apparatus configured to control motors 114 or other components of camera 107 to place components of camera 107 into a desired position. Camera controller 112 may also be configured to receive signals from sensors 116 regarding an actual position of camera 107 and/or regarding a status of camera 107. As shown in FIG. 1, camera controller 112 may include an embedded processor 111, interface control circuitry 109, and a shared memory 104 communicatively coupled to each of interface control circuitry 109 and embedded processor 111.

Embedded processor 111 may be integral to camera controller 112, and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (e.g., shared memory or other memory) and/or other computer-readable media accessible to embedded processor 111. Specifically, embedded processor 111 may be configured to perform functionality of camera controller 112, including but not limited to control and management of shared memory 104, control of motors 114, and receipt and processing of data from sensors 116.

Shared memory 104 may be integral to camera controller 112, and may be coupled to each of interface control circuitry 109 and embedded processor 111. Shared memory 104 may include any system, device, or apparatus configured to retain program instructions and/or data for a period of time (e.g., computer-readable media). Shared memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Interface control circuitry 109 may comprise any suitable system, device, or apparatus configured to serve as a communication interface between applications processor 103 and shared memory 104 and/or control a plurality of buffers 202 of shared memory 104 (see FIG. 2) as described in greater detail below.

Figure 2:
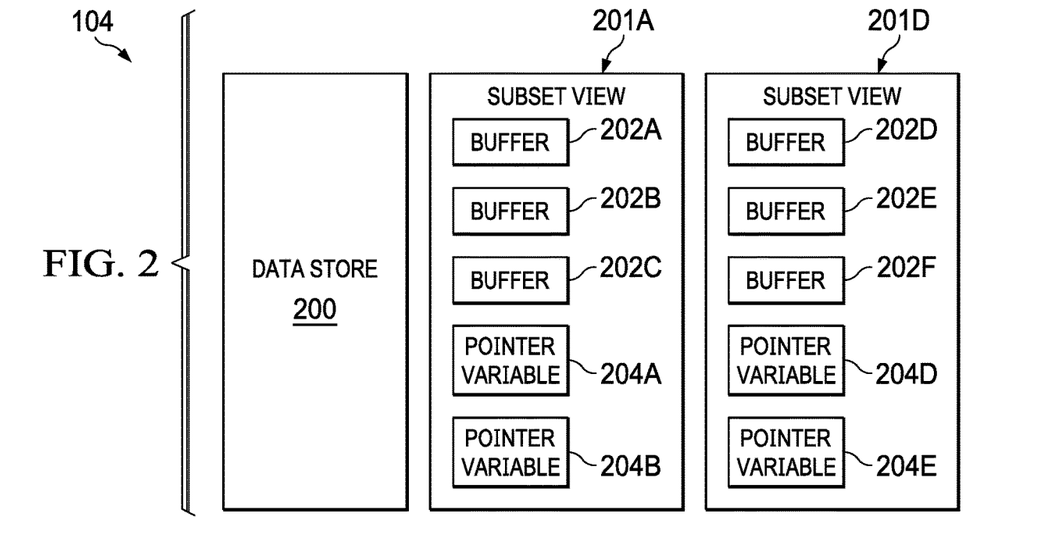
FIG. 2 illustrates a block diagram of selected components of an example shared memory, in accordance with embodiments of the present disclosure.

FIG. 2 illustrates a block diagram of selected components of an example shared memory 104, in accordance with embodiments of the present disclosure. As shown in FIG. 2, shared memory 104 may include a data store 200 comprising a plurality of registers for storing a data vector. Data store 200 may be configured to store a vector of data. A vector of data may include position and/or status information related to camera 107 communicated to shared memory 104 by camera 107 and/or returned for camera 107 by embedded processor 111.

Shared memory 104 may also have configured therein a plurality of subset views 201 (e.g., subset views 201A and 201D), each subset view 201 representing a subset of the registers of data stores 200 and each subset view comprising a respective plurality of three or more buffers 202 (e.g., buffers 202A, 202B, 202C, 202D, 202E, and 202F) for storing subset view data, as is described in greater detail below. In some instances, while storing different subsets of data, data stored in each subset view 201 may be partially overlapping, in that data from one or more registers of data store 200 may be represented in a plurality of subset views 201.

For the purposes of clarity and exposition, FIG. 2 depicts only two subset views 201. However, in actual operation, shared memory 104 may have any suitable number of subset views 201.

Each subset view 201 may include a plurality of at least three memory buffers 202. For example, as shown in FIG. 2, subset view 201A may include at least three memory buffers 202A, 202B, and 202C and subset view 201D may include at least three memory buffers 202D, 202E, and 202F. In addition, each subset view 201 may have associated therewith a plurality of pointer variables 204. As an example, as shown in FIG. 2, subset view 201A may have associated therewith a plurality of pointer variables 204A and 204B and subset view 201D may have associated therewith and a plurality of pointer variables 204D and 204E.

In operation, one pointer variable 204 (e.g., pointer variables 204A and 204D) of each particular subset view 201 may define for such particular subset view 201 a most-recently updated buffer of the plurality of buffers 202 to which information has been fully written by embedded processor 111. In addition, the other pointer variable (e.g., pointer variables 204B and 204E) of each particular subset view 201 may define for such particular subset view 201 an active buffer 202 of the plurality of buffers 202 from which applications processor 103 may be actively receiving information via interface control circuitry 109. Thus, camera controller 112 may be configured to maintain, for each particular subset view 201, a first variable (e.g., pointer variable 204B or pointer variable 204E) that defines an active buffer 202 of the plurality of buffers 202 of the particular subset view from which a receiver (e.g., applications processor 103) is receiving information and may also maintain, for the particular subset view 201, a second variable (e.g., pointer variable 204A) that defines the most-recently updated buffer 202 of the plurality of buffers 202 of the particular subset view 201 to which information has been fully written by the transmitter (e.g., camera 107).

Although FIG. 2 depicts each subset view 201 having three buffers 202, a subset view 201 may have any suitable number of three or more buffers 202.

In operation, camera controller 112 (e.g., via interface control circuitry 109 and/or embedded processor 111) may be configured to, responsive to a condition for transferring information represented by a subset view 201 to application processor 103 (e.g., responsive to a "read" command from application processor 103 to read data from a subset view 201), determine which of the plurality of buffers 202 of the subset view 201 from which applications processor 103 may receive most-recently updated information completely written to the plurality of buffers 202 of the subset view 201 by embedded processor 111. Such buffer 202 may be the buffer 202 defined as the most-recently updated buffer of the plurality of buffers 202 (e.g., as defined by pointer variable 204A or pointer variable 204D). Furthermore, in operation, responsive to a condition for updating information stored in data store 200 (e.g., a write of data to a subset view 201), camera controller 112 (e.g., via interface control circuitry 109 and/or embedded processor 111) may be configured to determine whether to update data store 200 and for each particular subset view 201 that represents data updated on data store 200, determine which of the plurality of buffers 202 of such subset view 201 for embedded processor 111 to write updated information, to ensure that data remains consistent across the various subset views 201 (e.g., to ensure that subset views 201 with overlapping data show the same version of the data). For example, responsive to the condition for updating information in data store 200 which is represented by subset view 201A, camera controller 112 (e.g., via interface control circuitry 109 and/or embedded processor 111) may select a selected buffer 202 from the plurality of buffers 202 other than the active buffer (if any) defined by pointer variable 204B and other than the most-recently updated buffer for the transmitter to write updated information as defined by pointer variable 204A. In addition, camera controller 112 (e.g., via interface control circuitry 109 and/or embedded processor 111) may be further configured to, responsive to completion of writing updated information by embedded processor 111 to the selected buffer 202, modify pointer variable 204A to define the selected buffer 202 as the most-recently updated buffer 202. In the presence of multiple subset views 201 with overlapping data, the selected buffer 202 of each subset view will have data written thereto, and after all such selected buffers have been written to, the appropriate pointer variables (e.g., 204A and 204D) of each subset view will be updated substantially contemporaneously in order to ensure consistency across subset views 201, as described in greater detail below.

Moreover, as a further example, camera controller 112 (e.g., via interface control circuitry 109 and/or embedded processor 111) may be further configured to, responsive to a condition for transferring information represented by subset view 201A to application processor 103 (e.g., responsive to a "read" command from application processor 103 to read data from a subset view 201), cause application processor 103 to receive information from the most-recently updated buffer 202 as defined by pointer variable 204A and, substantially contemporaneously to causing application processor 103 to receive information from the most-recently updated buffer 202 as defined by pointer variable 204A, modify pointer variable 204B to re-define the most-recently updated buffer 202 as the active buffer 202.

Further discussion of the functionality of camera controller 112 is set forth in FIGS. 3 through 5 below, and the descriptions thereof.

Figure 3:
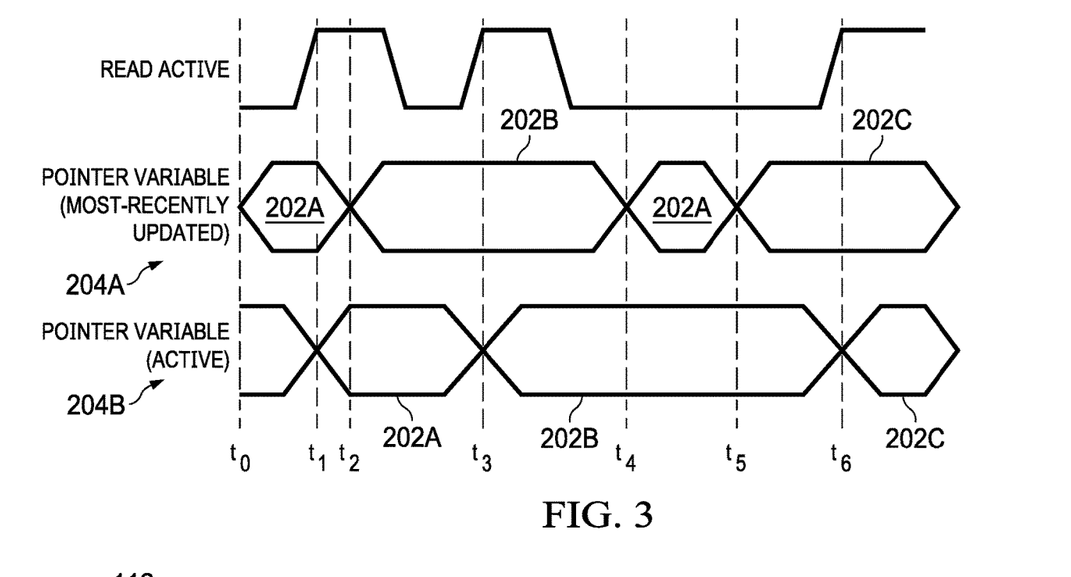
FIG. 3 illustrates a timing diagram depicting an example time progression of pointer variables, in accordance with embodiments of the present disclosure.

FIG. 3 illustrates a timing diagram depicting an example time progression of pointer variables 204 in connection with operations within a single subset view 201, in accordance with embodiments of the present disclosure. In particular, FIG. 3 illustrates such a timing diagram with respect to pointer variables 204A and 204B of subset view 201A, although the discussion of FIG. 3 could analogously be applied to pointer variables 204D and 204E, respectively, of subset view 201D. FIG. 4 illustrates a timing diagram depicting, within a single subset view 201, example selection of a free buffer 202, filling of a buffer 202 with data written from embedded processor 111, and reading of the data by an application processor 103, in accordance with embodiments of the present disclosure. In particular, FIG. 4 illustrates such a timing diagram with respect to buffers 202A, 202B, and 202C of subset view 201A, although the discussion of FIG. 4 could analogously be applied to buffers 202D, 202E, and 202F, respectively, of subset view 201D.

Figure 4:
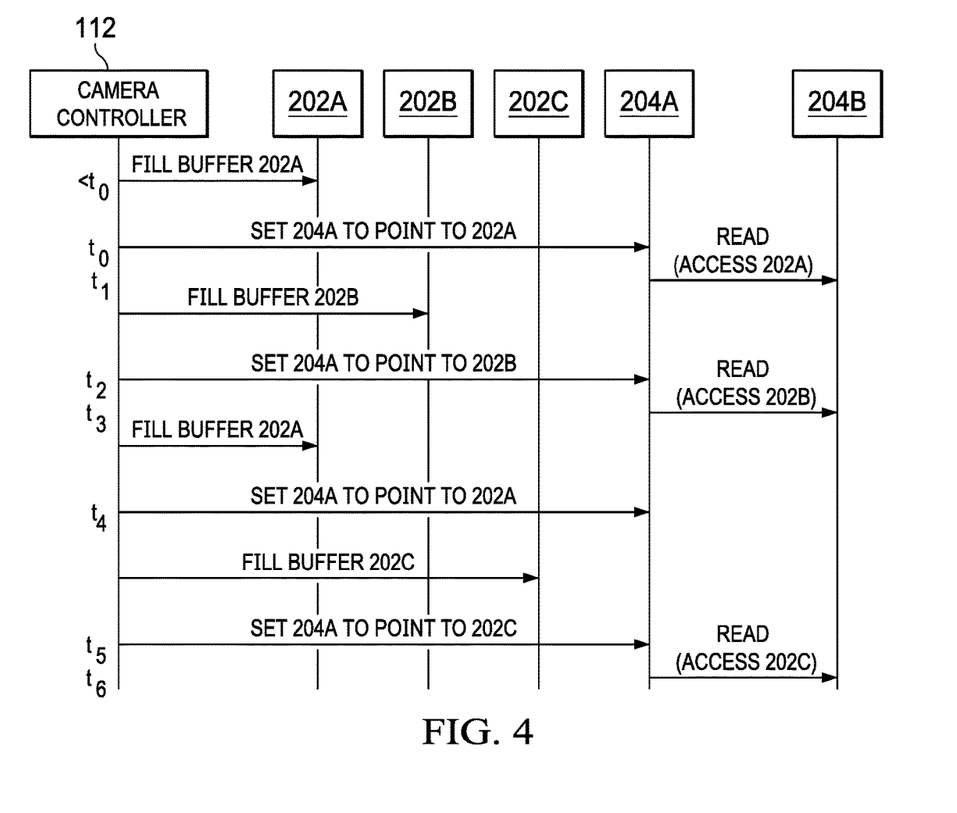
FIG. 4 illustrates a timing diagram depicting example selection of a free buffer, filling of a buffer with data written from a camera controller, and reading of the data by an application processor, in accordance with embodiments of the present disclosure.

As shown in FIGS. 3 and 4, at some time before a time $t_0$, all buffers 202 of subset view 201A may be free, and camera controller 112 may fill buffer 202A with data. At time $t_0$, after completion of the writing to buffer 202A with the data, camera controller 112 (e.g., via interface control circuitry 109 and/or embedded processor 111) may set pointer variable 204A to designate buffer 202A as the buffer which should be read responsive to a read command of subset view 201A from applications processor 103.

At a time $t_1$, a read command from applications processor 103 to subset view 201A may occur, and interface control circuitry 109 may cause the data in buffer 202A as designated by pointer variable 204A to be read by applications processor 103, and may also set pointer variable 204B to designate buffer 202A as the active buffer from which data is being read.

If additional data is written by embedded processor 111 to subset view 201A during the time applications processor 103 is actively receiving data, camera controller 112 (e.g., via interface control circuitry 109 and/or embedded processor 111) may cause data to be written to a buffer 202 (e.g., buffer 202B) other than the active buffer 202A (e.g., pointed to by pointer variable 204B) and the buffer 202 (if any) pointed to by pointer variable 204A. At time $t_2$, after completion of the writing to buffer 202B with the data, camera controller 112 (e.g., via interface control circuitry 109 and/or embedded processor 111) may set pointer variable 204A to designate buffer 202B as the buffer which should be read responsive to a read command from applications processor 103 to subset view 201A.

At a time $t_3$, a read command from applications processor 103 to subset view 201A may occur, and camera controller 112 (e.g., via interface control circuitry 109 and/or embedded processor 111) may cause the data in buffer 202B as designated by pointer variable 204A to be read by applications processor 103, and may also set pointer variable 204B to designate buffer 202B as the active buffer from which data is being read.

At a time after time $t_3$, if further additional data is written by embedded processor 111 to subset view 201A during the time applications processor 103 is actively receiving data, camera controller 112 (e.g., via interface control circuitry 109 and/or embedded processor 111) may cause data to be written to a buffer 202 (e.g., buffer 202A) other than the active buffer 202B and the buffer 202 (if any) pointed to by pointer variable 204A. At a time $t_4$, after data is written to buffer 202A, camera controller 112 (e.g., via interface control circuitry 109 and/or embedded processor 111) may set pointer variable 204A to designate buffer 202A as the buffer which should be read responsive to a read command from applications processor 103 to subset view 201A.

At a time after time Li, embedded processor 111 may again write data to subset view 201A, and camera controller 112 may cause data to be written to a buffer 202 (e.g., buffer 202C) other than the active buffer 202B designated by pointer variable 204A and the most-recently updated buffer 202A as designated by pointer variable 204B. At a time $t_5$, after data is written to buffer 202C, camera controller 112 may set pointer variable 204A to designate buffer 202C as the buffer which should be read responsive to a read command from applications processor 103 to subset view 201A. Accordingly, embedded processor 111 may write to buffers 202 asynchronously, and not every write to buffers 202 may be read by applications processor 103 (e.g., such as the write to buffer 202A occurring immediately before time $t_4$).

At a time $t_6$, a read command from applications processor 103 to subset view 201A may occur, and camera controller 112 (e.g., via interface control circuitry 109 and/or embedded processor 111) may cause the data in buffer 202C as designated by pointer variable 204A to be read by applications processor 103, and may also set pointer variable 204B to designate buffer 202C as the active buffer from which data is being read. In addition, use of three (or more) buffers 202 within a subset view 201 may ensure that camera controller 112 will be able to write to a buffer 202 that is not already in use. Furthermore, the architecture described herein may allow application processor 103 to perform asynchronous reads of the most recently written vector.

Figure 5:
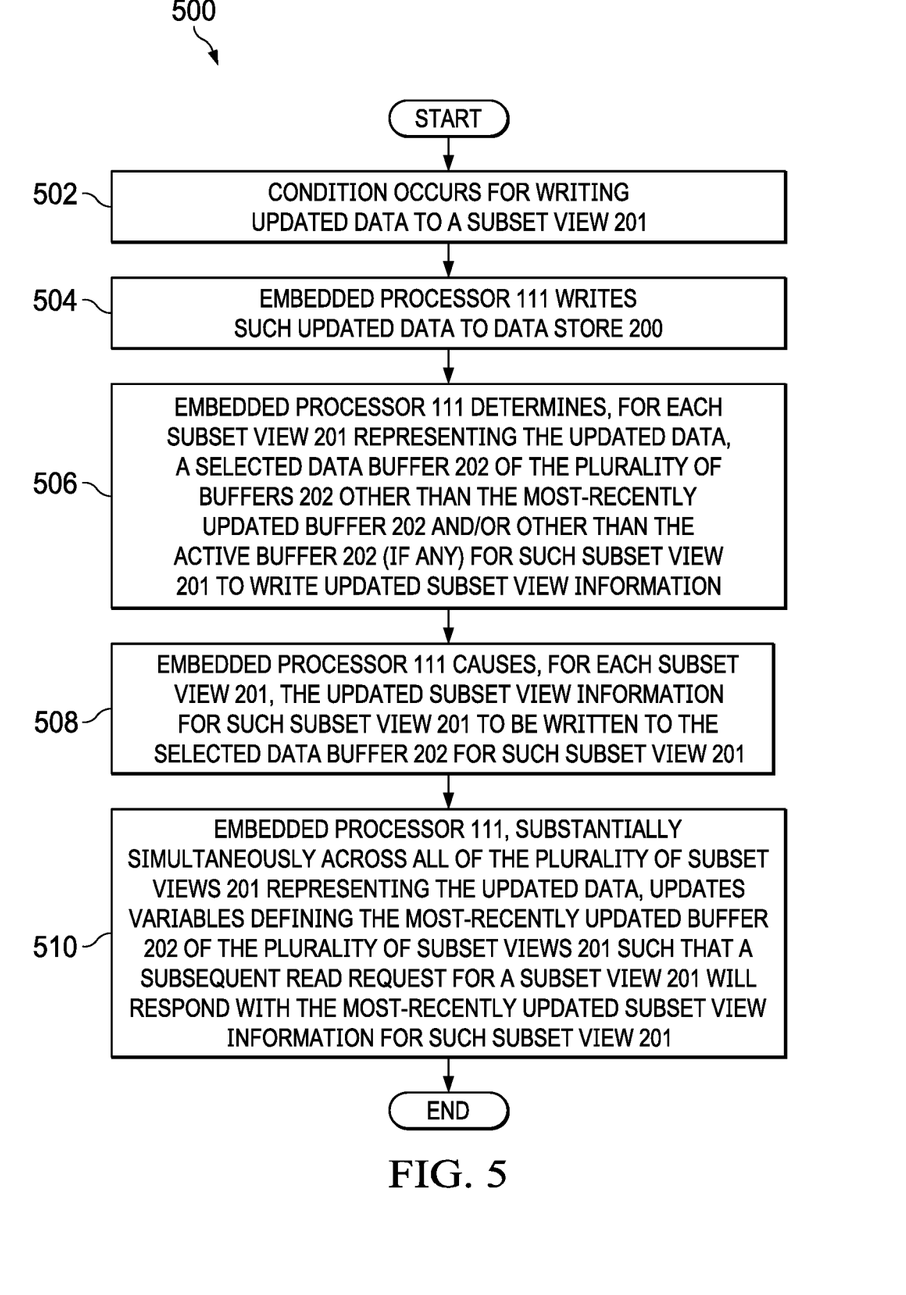
FIG. 5 illustrates a flow chart of an example method for updating a plurality of subset views in response to writing of a value to a subset view, in accordance with embodiments of the present disclosure.

FIG. 5 illustrates a flow chart of an example method 500 for updating a plurality of subset views 201 in response to writing of a value to a subset view 201, in accordance with embodiments of the present disclosure. According to certain embodiments, method 500 may begin at step 502. As noted above, teachings of the present disclosure may be implemented in a variety of configurations of mobile device 102. As such, the preferred initialization point for method 500 and the order of the steps comprising method 500 may depend on the implementation chosen. In these and other embodiments, method 500 may be implemented as firmware, software, applications, functions, libraries, or other instructions.

At step 502, a condition may occur for writing updated data to a subset view 201. For example, such condition may include a request by embedded processor 111 to write data to a subset view 201. At step 504, responsive to the condition, embedded processor 111 may write such updated data to data store 200. At step 506, embedded processor 111 may determine, for each subset view 201 representing the updated data, a selected data buffer 202 of the plurality of buffers 202 other than the most-recently updated buffer 202 for such subset view 201 (e.g., as indicated by pointer variables 204A and 204D) and other than the active buffer (if any) for each subset view 201 (e.g., as indicated by pointer variables 204B and 204E) to write updated subset view information representative of the updated data. At step 508, embedded processor 111 may cause, for each subset view 201, the updated subset view information for such subset view 201 to be written to the selected data buffer 202 for such subset view 201. At step 510, embedded processor 111 may, following the completion of step 508 with respect to all subset views 201, substantially simultaneously across all of the plurality of subset views 201 representing the updated data, update the variables (e.g., as indicated by pointer variables 204A and 204D) defining the most-recently updated buffer 202 of the plurality of subset views 201 such that a subsequent read request for a subset view 201 will respond with the updated subset view information for such subset view 201.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using camera controller 112, components thereof or any other system operable to implement method 500. In certain embodiments, method 500 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system for reading a plurality of subset views of an evolving data store, comprising:
   for each subset view, a plurality of memory buffers comprising at least three buffers;
   control circuitry for controlling the plurality of memory buffers of the plurality of subset views, the control circuitry configured to:
   maintain, for each subset view, a variable defining a most-recently updated buffer of the plurality of buffers such that a read request for such subset view will respond with data of the most-recently updated buffer of such subset view; and
   responsive to an update of data of the evolving data store:
   determine, for each subset view, a selected data buffer of the plurality of buffers other than the most-recently updated buffer for such subset view to write updated subset view information;
   cause, for each subset view, the updated subset view information for such subset view to be written to the selected data buffer for such subset view; and
   substantially simultaneously across all of the plurality of subset views, update the variables defining the most-recently updated buffer of the plurality of subset views such that a subsequent read request for a subset view will respond with the updated subset view information for such subset view.

2. The system of claim 1, wherein the control circuitry is further configured to maintain for each subset view a second variable that defines an active buffer of the plurality of buffers of the subset view from which data is actively being read responsive to a read request to the subset view.

3. The system of claim 2, wherein the control circuitry is further configured to determine the selected data buffer for each subset view as a buffer of the plurality of buffers for such subset view other than the active buffer and other than the most-recently updated buffer for such subset view.

4. The system of claim 1, wherein the control circuitry comprises a camera controller for controlling one or more components of a camera and the evolving data store stores data regarding a position of the camera.

5. A method for reading a plurality of subset views of an evolving data store, comprising:
   for each subset view, maintaining a plurality of memory buffers comprising at least three buffers;
   maintaining, for each subset view, a variable defining a most-recently updated buffer of the plurality of buffers such that a read request for such subset view will respond with data of the most-recently updated buffer of such subset view; and
   responsive to an update of data of the evolving data store:
   determining, for each subset view, a selected data buffer of the plurality of buffers other than the most-recently updated buffer for such subset view to write updated subset view information;
   causing, for each subset view, the updated subset view information for such subset view to be written to the selected data buffer for such subset view; and
   substantially simultaneously across all of the plurality of subset views, updating the variables defining the most-recently updated buffer of the plurality of subset views such that a subsequent read request for a subset view will respond with the updated subset view information for such subset view.

6. The method of claim 5, further comprising maintaining for each subset view a second variable that defines an active buffer of the plurality of buffers of the subset view from which data is actively being read responsive to a read request to the subset view.

7. The method of claim 6, further comprising determining the selected data buffer for each subset view as a buffer of the plurality of buffers for such subset view other than the active buffer and other than the most-recently updated buffer for such subset view.

8. The method of claim 5, wherein the evolving data store stores data regarding a position of a camera.

9. A computer program product embodied in non-transitory computer readable media, the computer program product for reading a plurality of subset views of an evolving data store, the computer program product comprising a computer usable medium having computer readable code physically embodied therein, said computer program product further comprising computer readable program code for:
   for each subset view, maintaining a plurality of memory buffers comprising at least three buffers;
   maintaining, for each subset view, a variable defining a most-recently updated buffer of the plurality of buffers such that a read request for such subset view will respond with data of the most-recently updated buffer of such subset view; and
   responsive to an update of data of the evolving data store:
   determining, for each subset view, a selected data buffer of the plurality of buffers other than the most-recently updated buffer for such subset view to write updated subset view information;
   causing, for each subset view, the updated subset view information for such subset view to be written to the selected data buffer for such subset view; and
   substantially simultaneously across all of the plurality of subset views, updating the variables defining the most-recently updated buffer of the plurality of subset views such that a subsequent read request for a subset view will respond with the updated subset view information for such subset view.

10. The computer program product of claim 9, the computer readable program code further for maintaining for each subset view a second variable that defines an active buffer of the plurality of buffers of the subset view from which data is actively being read responsive to a read request to the subset view.

11. The computer program product of claim 10, the computer readable program code further for determining the selected data buffer for each subset view as a buffer of the plurality of buffers for such subset view other than the active buffer and other than the most-recently updated buffer for such subset view.

12. The computer program product of claim 9, wherein the evolving data store stores data regarding a position of a camera.

13. A camera controller comprising:
for each subset view of a plurality of subset views of an evolving data store, a plurality of memory buffers comprising at least three buffers; and
a processor configured to:
  maintain, for each subset view, a variable defining a most-recently updated buffer of the plurality of buffers such that a read request for such subset view will respond with data of the most-recently updated buffer of such subset view; and
  responsive to an update of data of the evolving data store:
    determine, for each subset view, a selected data buffer of the plurality of buffers other than the most-recently updated buffer for such subset view to write updated subset view information;
    cause, for each subset view, the updated subset view information for such subset view to be written to the selected data buffer for such subset view; and
    substantially simultaneously across all of the plurality of subset views, update the variables defining the most-recently updated buffer of the plurality of subset views such that a subsequent read request for a subset view will respond with the updated subset view information for such subset view.

14. The camera controller of claim 13, wherein the processor is further configured to maintain for each subset view a second variable that defines an active buffer of the plurality of buffers of the subset view from which data is actively being read responsive to a read request to the subset view.

15. The camera controller of claim 14, wherein the processor is further configured to determine the selected data buffer for each subset view as a buffer of the plurality of buffers for such subset view other than the active buffer and other than the most-recently updated buffer for such subset view.

16. The camera controller of claim 13, wherein the evolving data store stores data regarding a position of the camera.

* * * * *